United States Patent
Masai

(10) Patent No.: US 10,908,854 B1
(45) Date of Patent: Feb. 2, 2021

(54) IMAGE FORMING SYSTEM AND IMAGE FORMING APPARATUS THAT PERFORM MAINTENANCE OR CANCEL OF SLEEP MODE

(71) Applicant: KYOCERA Document Solutions Inc., Osaka (JP)

(72) Inventor: Katsunori Masai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/919,023

(22) Filed: Jul. 1, 2020

(30) Foreign Application Priority Data

Jul. 8, 2019 (JP) ................................. 2019-127123

(51) Int. Cl.
G06F 3/12 (2006.01)
(52) U.S. Cl.
CPC .......... *G06F 3/1221* (2013.01); *G06F 3/1229* (2013.01); *G06F 3/1267* (2013.01); *G06F 3/1292* (2013.01)
(58) Field of Classification Search
CPC .... G06F 3/1221; G06F 3/1229; G06F 3/1267; G06F 3/1292
USPC ...................................................... 358/1.14
See application file for complete search history.

(56) References Cited

U.S. PATENT DOCUMENTS

| | | | | |
|---|---|---|---|---|
| 2012/0159223 | A1* | 6/2012 | Furubayashi | G06F 1/3215 713/323 |
| 2017/0013153 | A1* | 1/2017 | Shin | H04N 1/00891 |
| 2018/0024784 | A1* | 1/2018 | Watanabe | H04N 1/00973 709/205 |
| 2018/0032291 | A1* | 2/2018 | Goto | G06F 3/1221 |
| 2019/0265924 | A1* | 8/2019 | Ikeda | G06F 3/1207 |

FOREIGN PATENT DOCUMENTS

JP 2019-028138 A 2/2019

* cited by examiner

*Primary Examiner* — Allen H Nguyen
(74) *Attorney, Agent, or Firm* — IP Business Solutions, LLC

(57) ABSTRACT

An image forming system includes an image forming apparatus and a mobile terminal device. In the image forming apparatus, when a first short-range communication device receives second identification information after a first control device allows formation of an image on a recording paper sheet and storage of first identification information, the first control device determines correspondence or non-correspondence between the first and second identification information. In a power-saving sleep mode of the image forming apparatus, the first control device maintains the sleep mode in the case of the correspondence or cancels the sleep mode in the case of the non-correspondence. When short-range communication is enabled between the first short-range communication device and a second short-range communication device of the mobile terminal device, a second control device of the mobile terminal device allows the second short-range communication device to send the second identification information to the first short-range communication device.

10 Claims, 4 Drawing Sheets

IMAGE FORMING SYSTEM AND IMAGE FORMING APPARATUS THAT PERFORM MAINTENANCE OR CANCEL OF SLEEP MODE

INCORPORATION BY REFERENCE

This application claims priority to Japanese Patent Application No. 2019-127123 filed on 8 Jul. 2019, the entire contents of which are incorporated by reference herein.

BACKGROUND

The present disclosure relates to a technique for appropriately setting a sleep mode of an image forming apparatus in sending a print job from a terminal device, such as a PC (personal computer) or a mobile terminal device, to the image forming apparatus to allow the image forming apparatus to execute the print job.

In an image forming system, a print job is sent via a network from a terminal device, such as a PC or a mobile terminal device, to an image forming apparatus and the print job is executed by the image forming apparatus. Furthermore, the image forming apparatus is appropriately switched between a standby mode where an immediate transition from a standby state to processing for forming an image on a recording paper sheet is possible and a sleep mode or the like that requires less power than the standby mode.

For example, in a general image forming system, when an image forming apparatus accepts a request to form an image from a computer, it allows an image forming device to form the image on a recording paper sheet, acquires and holds user information relevant to the computer, and starts counting the elapsed time from when the request is accepted. Then, the image forming apparatus in a sleep mode waits for the detection of a human body by a motion sensor while performing power saving. Upon detection of a human body by the motion sensor, the image forming apparatus acquires user information via short-range communication from a name plate worn by the detected human body.

When the image forming apparatus determines that the user information relevant to the computer is consistent with the user information acquired from the name plate and further determines that the elapsed time is not over a predetermined time, the image forming apparatus considers that the user having given an instruction to form the image has come to pick up the recording paper sheet, and maintains the sleep mode. Thus, unnecessary cancellation of the sleep mode can be avoided and power saving can be effectively achieved.

SUMMARY

A technique improved over the aforementioned technique is proposed as one aspect of the present disclosure.

An image forming system according to an aspect of the present disclosure includes an image forming apparatus and a mobile terminal device. The mobile terminal device performs short-range communication with the image forming apparatus.

The image forming apparatus includes an image forming device, a storage device, a first short-range communication device, and a first control device. The image forming device forms an image on a recording paper sheet. The storage device stores first identification information for use in identifying a user having given an instruction to form the image. The first short-range communication device performs wireless communication with the mobile terminal device. The first control device includes a processor and, upon execution of a control program by the processor, functions as a first controller that, when the first short-range communication device receives second identification information sent from the mobile terminal device and for use in identifying a user of the mobile terminal device after the first controller allows the image forming device to form the image on the recording paper sheet and allows the storage device to store the first identification information, determines whether or not the received second identification information corresponds to the first identification information stored in the storage device, wherein when the first controller determines that the second identification information corresponds to the first identification information while the image forming apparatus is set to a sleep mode requiring less power, the first controller maintains the image forming apparatus in the sleep mode, and wherein when the first controller determines that the second identification information does not correspond to the first identification information while the image forming apparatus is set to the sleep mode, the first controller cancels the sleep mode. The mobile terminal device includes a second short-range communication device and a second control device. The second short-range communication device performs wireless communication with the image forming apparatus. The second control device includes a processor and, upon execution of a control program by the processor, functions as a second controller that allows the second short-range communication device to send the second identification information to the first short-range communication device when the first short-range communication device of the image forming apparatus or the second short-range communication device of the mobile terminal device performs advertising communication to enable short-range communication between the first short-range communication device and the second short-range communication device.

An image forming apparatus according to another aspect of the present disclosure performs short-range communication with a mobile terminal device. The image forming apparatus includes an image forming device, a storage device, a first short-range communication device, and a first control device. The image forming device forms an image on a recording paper sheet. The storage device stores first identification information for use in identifying a user having given an instruction to form the image. The first short-range communication device performs wireless communication with the mobile terminal device. The first control device includes a processor and, upon execution of a control program by the processor, functions as a first controller that, when the first short-range communication device receives second identification information sent from the mobile terminal device and for use in identifying a user of the mobile terminal device after the first controller allows the image forming device to form the image on the recording paper sheet and allows the storage device to store the first identification information, determines whether or not the received second identification information corresponds to the first identification information stored in the storage device, wherein when the first controller determines that the second identification information corresponds to the first identification information while the image forming apparatus is set to a sleep mode requiring less power, the first controller maintains the image forming apparatus in the sleep mode, and wherein when the first controller determines that the second identification information does not correspond to the first identification information while the image forming apparatus is set to the sleep mode, the first controller cancels the sleep mode.

An image forming system according to still another aspect of the present disclosure includes an image forming apparatus and a mobile terminal device. The mobile terminal device performs short-range communication with the image forming apparatus. The image forming apparatus includes an image forming device, a storage device, a first short-range communication device, and a first control device. The image forming device forms an image on a recording paper sheet. The storage device stores the image to be formed and first identification information for use in identifying a user having given an instruction to form the image. The first short-range communication device performs wireless communication with the mobile terminal device. The first control device includes a processor and, upon execution of a control program by the processor, functions as a first controller that, when the first short-range communication device receives second identification information sent from the mobile terminal device and for use in identifying a user of the mobile terminal device after the first controller allows the storage device to store the image and the first identification information, determines whether or not the received second identification information corresponds to the first identification information stored in the storage device, wherein when the first controller determines that the second identification information corresponds to the first identification information, the first controller allows the image to be read from the storage device and allows the image forming apparatus to form the read image on a recording paper sheet. The mobile terminal device includes a second short-range communication device and a second control device. The second short-range communication device performs wireless communication with the image forming apparatus. The second control device includes a processor and, upon execution of a control program by the processor, functions as a second controller that allows the second short-range communication device to send the second identification information to the first short-range communication device when the first short-range communication device of the image forming apparatus or the second short-range communication device of the mobile terminal device performs advertising communication to enable short-range communication between the first short-range communication device and the second short-range communication device.

DETAILED DESCRIPTION

Hereinafter, a description will be given of image forming systems and image forming apparatuses according to embodiments of the present disclosure with reference to the drawings.

First Embodiment

Figure 1:
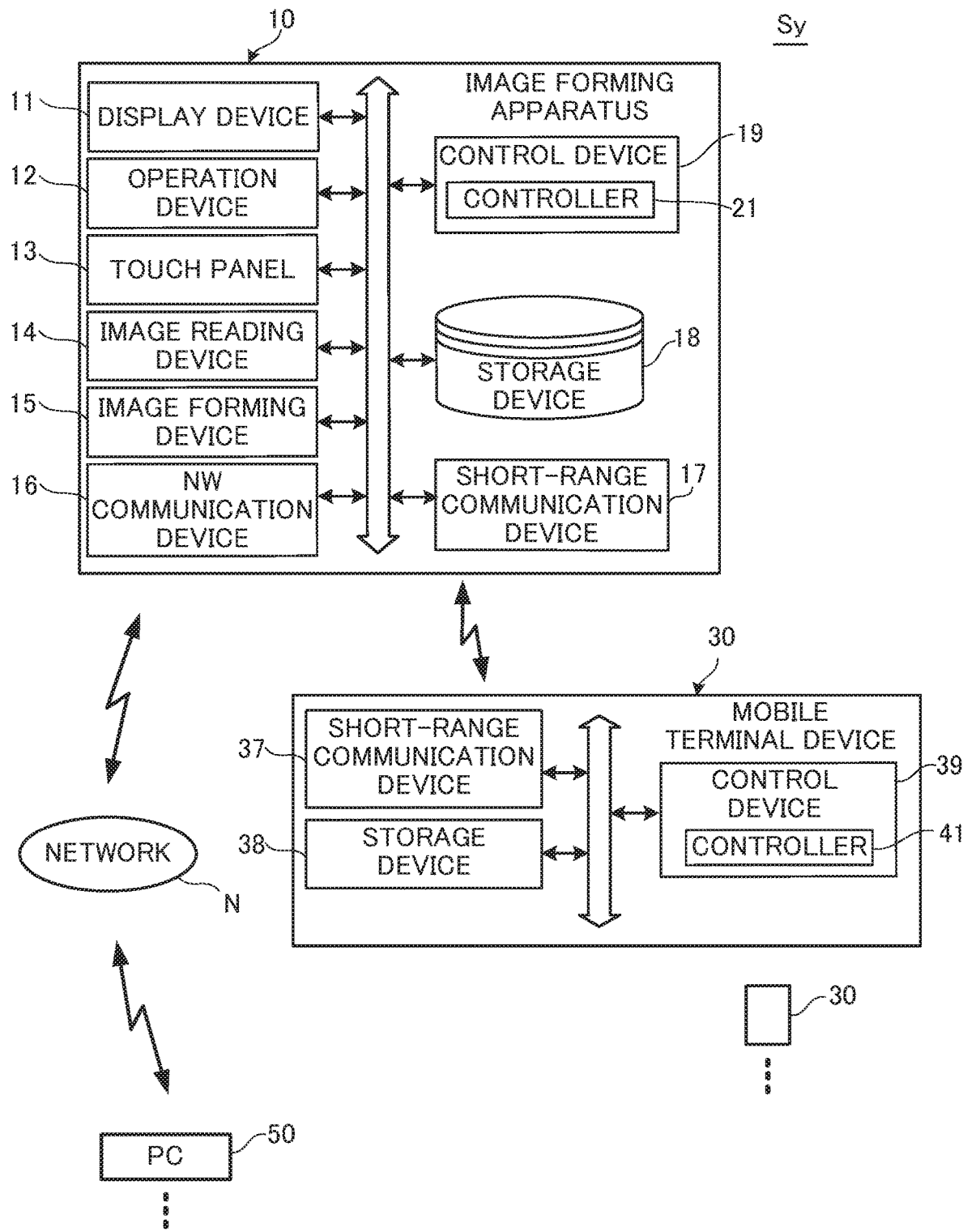
FIG. 1 is a block diagram showing the configuration of an image forming apparatus, the configuration of a mobile terminal device, and a personal computer in an image forming system according to a first embodiment of the present disclosure.

FIG. 1 is a block diagram showing an image forming system according to a first embodiment of the present disclosure. The image forming system Sy according to this embodiment includes an image forming apparatus 10, a plurality of mobile terminal devices 30, and a plurality of PCs 50. The image forming apparatus 10 and each of the PCs 50 are capable of data communication with each other via a network N. There is no particular limitation as to the number of mobile terminal devices 30 and PCs 50 included in the image forming system Sy and, for example, the image forming system Sy may include a single mobile terminal device 30 and a single PC 50.

Furthermore, the image forming apparatus 10 and each of the mobile terminal devices 30 are capable of data communication with each other by performing short-range communication based on, for example, the Bluetooth Low Energy (BLE, where Bluetooth is a registered trademark). The mobile terminal device 30 is, for example, an IC (integrated circuit) card equipped with an integrated circuit for information storage and arithmetic processing.

In the image forming system Sy, the image forming apparatus 10 according to an embodiment of the present disclosure is, for example, a multifunction peripheral (MFP) having multiple functions, including a copy function, a print function, and a scan function. The image forming apparatus 10 includes a display device 11, an operation device 12, a touch panel 13, an image reading device 14, an image forming device 15, a network communication device 16, a short-range communication device 17, a storage device 18, a control device 19, and so on. These components are capable of data or signal transfer via a bus among them.

The image reading device 14 includes a scanner capable of optically reading an original document placed on an original glass plate and generates image data representing an image of the original document.

The image forming device 15 includes a photosensitive drum, a charging device operable to uniformly charge the surface of the photosensitive drum, an exposure device operable to expose the surface of the photosensitive drum to light to form an electrostatic latent image on the surface thereof, a developing device operable to develop the electrostatic latent image on the surface of the photosensitive drum into a toner image, a transfer device operable to transfer the toner image on the surface of the photosensitive drum to a recording paper sheet, and so on. The image forming device 15 forms the image represented by the image data on the recording paper sheet.

The display device 11 is formed of a liquid crystal display (LCD), an organic EL (organic light-emitting diode (OLED)) display or the like.

The operation device 12 includes hard keys, including numeric keys, an Enter key, and a Start key.

A touch panel 13 is disposed over the screen of the display device 11. The touch panel 13 detects a touch on the touch panel 13 with a user's finger or the like, together with a point of touch, and thus allows a user's instruction on the screen of the display device 11 to be input through the touch panel 13. Therefore, the touch panel 13 serves as an operation device through which a user's operation on the screen of the display device 11 is to be input.

The network communication device 16 is a communication interface including a communication module, such as a LAN (local area network) chip. The network communication device 16 is connected through a network N (such as an intranet) to the PCs 50 and the like and performs data communication with the PCs 50 and the like.

The short-range communication device 17 is a communication circuit for use in data communications with the mobile terminal devices 30 through short-range communication based on the Bluetooth® Low Energy.

The storage device 18 is formed of a large storage device, such as an SSD (solid state drive) or an HDD (hard disk drive), and stores various types of data and programs.

The control device 19 is made up of a processor, a RAM (random access memory), a ROM (read only memory), and so on. The processor is, for example, a CPU (central processing unit), an ASIC (application specific integrated circuit) or an MPU (micro processing unit). When a control program stored in the ROM or the storage device 18 is executed by the above processor, the control device 19 functions as a controller 21.

The control device 19 governs the overall operation control of the image forming apparatus 10. Furthermore, the control device 19 is connected to the display device 11, the operation device 12, the touch panel 13, the image reading device 14, the image forming device 15, the network communication device 16, the short-range communication device 17, the storage device 18, and so on and performs control on each of the above components, signal or data transfer to and from each of the components, and so on.

The controller 21 serves as a processor that executes various types of processing. Furthermore, the controller 21 has the function of controlling the display device 11, the network communication device 16, and the short-range communication device 17.

In the image forming system Sy, the plurality of mobile terminal devices 30 are, for example, IC cards as described previously. Each of the mobile terminal devices 30 includes a short-range communication device 37, a storage device 38, and a control device 39. These components are capable of data or signal transfer via a bus among them.

The short-range communication device 37 is a communication circuit for use in data communications with the image forming apparatus 10 through short-range communication based on the Bluetooth® Low Energy.

The storage device 38 is a memory, such as a RAM (random access memory), and stores various types of application programs, various types of information, and so on.

The control device 39 is made up of a CPU, a RAM, a ROM, and so on. When a control program stored in the ROM or the storage device 38 is executed by the above CPU, the control device 39 functions as a controller 41. Alternatively, the RAM in the control device 39 may serve as the storage device 38.

The control device 39 governs the overall operation control of the mobile terminal device 30. Furthermore, the control device 39 is connected to the short-range communication device 37, the storage device 38, and so on and performs control on each of the above components, signal or data transfer to and from each of the components, and so on.

The controller 41 serves as a processor that executes various types of processing. Furthermore, the controller 41 has the function of controlling the short-range communication device 37.

Figure 2:
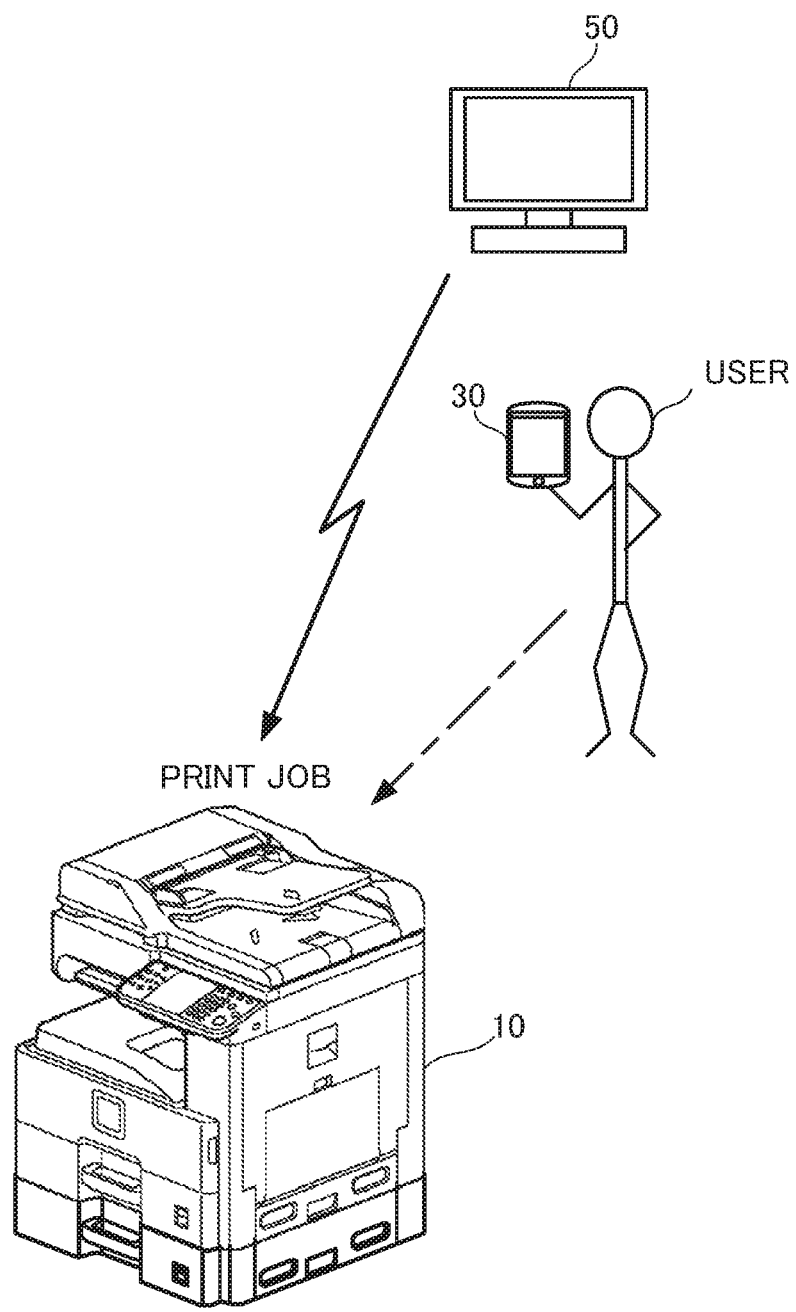
FIG. 2 is a view for illustrating a state where a user carrying a mobile terminal is approaching the image forming apparatus.

In the image forming system Sy having the above structure, the controller 41 of the mobile terminal device 30 controls the short-range communication device 37 to allow the short-range communication device 37 to periodically send an advertising frame through an advertising channel. For example, the advertising frame contains a universally unique identifier UUID and a non-scannable request. When, as shown in FIG. 2, a user carrying the mobile terminal device 30 comes close to the image forming apparatus 10, the short-range communication device 17 of the image forming apparatus 10 receives an advertising frame sent from the mobile terminal device 30. The controller 21 of the image forming apparatus 10 extracts a universally unique identifier UUID from the received advertising frame, checks the extracted universally unique identifier UUID against a plurality of universally unique identifiers UUID in an advertising management table previously stored in the storage device 18, and certifies the extracted universally unique identifier UUID. The universally unique identifier UUID is an example of second identification information defined in What is claimed is.

Furthermore, in the image forming apparatus 10, the controller 21 switches the image forming apparatus 10 from a sleep mode to a standby mode. Alternatively, when the image forming apparatus 10 is already set to the standby mode by the controller 21, the controller 21 maintains the image forming apparatus 10 in the standby mode.

The standby mode is a mode in which the image forming device 15 can immediately start the formation of an image on a recording paper sheet. On the other hand, the sleep mode is a mode which requires less power than the standby mode and in which the image forming device 15 takes time to start the formation of an image on a recording paper sheet.

As described above, when the user carrying the mobile terminal device 30 comes close to the image forming apparatus 10, the image forming apparatus 10 is switched from the sleep mode to the standby mode or maintained in the standby mode. Therefore, when the user of the mobile terminal device 30 comes even close to and arrives at the image forming apparatus 10, the user can immediately use the image forming apparatus 10.

Thereafter, for example, when the user of the mobile terminal device 30 places an original document in the image reading device 14 and operates the operation device 22 or the touch panel 23 to select a copy job and give an instruction to execute the copy job, the controller 21 accepts the instruction, allows the image reading device 14 to read an image of the original document, and allows the image forming device 15 to form the image of the original document on a recording paper sheet.

Furthermore, when a predetermined specific time TS has passed since the end of the copy job or when the specific time TS has passed since the end of the operation of the operation device 12, the controller 21 returns the image forming apparatus 10 from the standby mode to the sleep mode.

Meanwhile, the PC 50 of the user sends the print job and a user's own identifier YID via the network N to the image forming apparatus 10 in accordance with an instruction from the user. When the network communication device 16 of the image forming apparatus 10 receives the print job and the user's identifier YID, the controller 21 determines whether or not the user's identifier YID is consistent with any one of a plurality of uses' identifiers YID in a login management table stored in the storage device 18. When the controller 21 determines that the user's identifier YID is consistent with one of the users' identifiers, the controller 21 certifies the user's identifier YID, permits the user having the identifier YID to log in to the image forming apparatus 10, and executes the received print job to allow the image forming device 15 to form the image on a recording paper sheet. The user's identifier YID is an example of first identification information defined in What is claimed is.

Thereafter, the user comes to the image forming apparatus 10 and picks up the recording paper sheet with the image formed thereon. However, if, upon permission of user's login to the image forming apparatus 10 due to user's approach to the image forming apparatus 10, the image forming apparatus 10 were switched from the sleep mode to the standby mode, this would be unfavorable in terms of power saving because the image forming apparatus 10 would be set to the standby mode even though the user would merely come to pick up the recording paper sheet and would not operate and use the image forming apparatus 10.

To cope with this, in this embodiment, when the image forming apparatus 10 is in the sleep mode at the time of arrival of the user having given an instruction to execute the print job at the image forming apparatus 10 after the execution of the print job by the image forming apparatus 10, the controller 21 maintains the image forming apparatus 10 in the sleep mode. Thus, it can be avoided that the image forming apparatus 10 is switched in vain from the sleep mode to the standby mode, so that further power saving can be achieved.

Next, a description will be given of a control in which the image forming apparatus 10 is maintained in the sleep mode when a user having given an instruction to execute a print job comes to the image forming apparatus 10 as described above, with reference to the flowchart shown in FIG. 3.

First, in the image forming apparatus 10, the controller 21 waits until the network communication device 16 receives a print job and a user's identifier YID sent from a PC 50 ("No" in step S101). When the print job and the user's identifier YID sent from the PC 50 are received by the network communication device 16 ("Yes" in step S101), the controller 21 determines whether or not the received user's identifier YID is consistent with any one of the plurality of users' identifiers in the login management table in the storage device 18. When the controller 21 determines that the user's identifier YID is consistent with one of the users' identifiers, the controller 21 certifies the received user's identifier YID, permits the user of the received identifier YID to log in to the image forming apparatus 10 (step S102), and executes the received print job to allow the image forming device 15 to form an image on a recording paper sheet (step S103).

Furthermore, the controller 21 associates the received user's identifier YID with information indicating that the print job has been executed, and allows the storage device 18 to store the associated user's identifier YID (step S104).

Moreover, the controller 21 starts counting the elapsed time T from the end of the print job (step S105).

After, as described above, the print job is executed and the user's identifier YID is stored in the storage device 18 in association with the information indicating the print job has been executed, the controller 21 of the image forming apparatus 10 determines whether or not the elapsed time T has reached a previously defined time t (step S106) and determines whether or not an advertising frame sent from a mobile terminal device 30 has been received by the short-range communication device 17 (step S107).

For example, when, before the elapsed time T reaches the defined time t ("No" in step S106), a user carrying a mobile terminal device 30 comes close to the image forming apparatus 10 and an advertising frame has been received by the short-range communication device 17 ("Yes" in step S107), the controller 21 extracts a universally unique identifier UUID from the received advertising frame and certifies the extracted universally unique identifier UUID. Furthermore, the controller 21 of the image forming apparatus 10 permits the user to log in to the image forming apparatus 10 (step S108).

Then, the controller 21 determines whether or not the extracted universally unique identifier UUID is a universally unique identifier UUID corresponding to the user's identifier YID stored, in step S104, in the storage device 18 in association with the information indicating that the print job has been executed (step S109). In this relation, the controller 21 allows, for example, the storage device 18 or a memory built in the control device 19 to previously store a plurality of universally unique identifiers UUID and respective associated users' identifiers YID.

For example, when the controller 21 determines that the extracted universally unique identifier UUID corresponds to the identifier YID stored in the storage device 18 ("Yes" in step S109), this means that the user of the mobile terminal device 30 is coming to the image forming apparatus 10 merely for the purpose of picking up the recording paper sheet. Therefore, when at this time the image forming apparatus 10 is set to the standby mode, the controller 21 maintains the image forming apparatus 10 in the standby mode. On the other hand, when at this time the specific time TS has elapsed from the end of the job or the end of the operation of the operation device 12 and, thus, the image forming apparatus 10 has been set to the sleep mode, the controller 21 does not switch the image forming apparatus 10 from the sleep mode to the standby mode, but maintains the image forming apparatus 10 in the sleep mode (step S110).

Thus, it can be avoided that the image forming apparatus 10 is switched in vain from the sleep mode to the standby mode, so that further power saving can be achieved.

Figure 3:
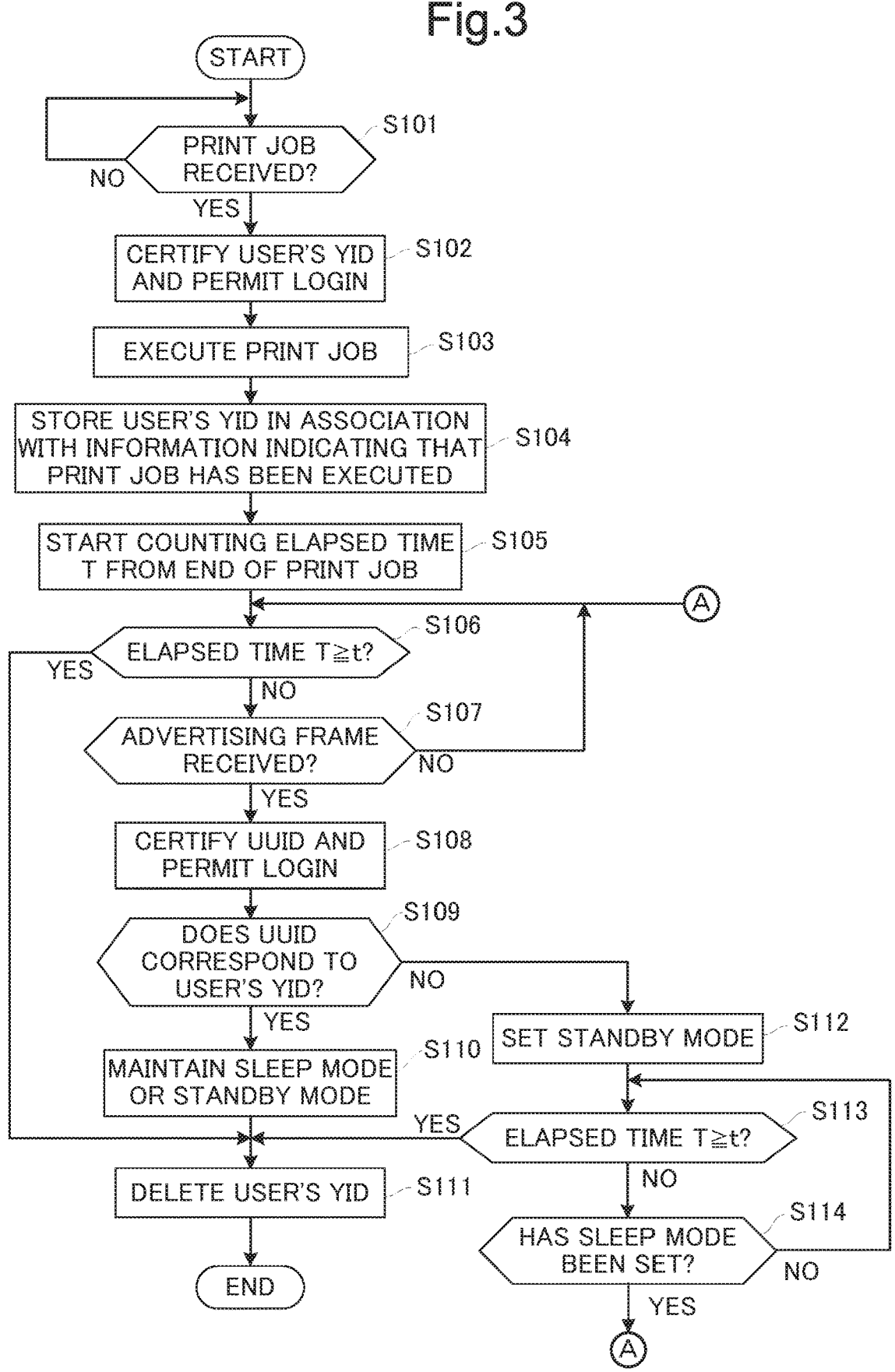
FIG. 3 is a flowchart showing a control in which the image forming apparatus is maintained in a sleep mode when a user having given an instruction to execute a print job comes to the image forming apparatus.

Furthermore, the controller 21 deletes from the storage device 18 the user's identifier YID associated with the information indicating that the print job has been executed (step S111), and ends the processing shown in FIG. 3.

When, as just described, the user of the mobile terminal device 30 comes to the image forming apparatus 10 for the purpose of picking up the recording paper sheet, the user's identifier YID is deleted from the storage device 18. Therefore, even when the same user comes close to the image forming apparatus 10 again for another copy job and the user's universally unique identifier UUID is certified (step S108), the controller 21 determines that the user's certified universally unique identifier UUID does not correspond to any user's identifier YID stored in the storage device 18 in association with information indicating that a print job has been executed ("No" in step S109), and the controller 21 does not maintain the image forming apparatus 10 in the sleep mode, but sets the image forming apparatus 10 to the standby mode (step S112). Thus, the user can immediately execute the copy job.

On the other hand, when, without receipt of an advertising frame by the short-range communication device 17 ("No" in step S107) and without approach of a user of a mobile terminal device 30 to the image forming apparatus 10, the elapsed time T reaches the defined time t ("Yes" in step S106), the controller 21 deletes the user's identifier YID stored, in step S104, in the storage device 18 in association with the information indicating that the print job has been executed, without executing the processing steps from steps S108 to S110 (step S111). Thus, it is avoided that the sleep mode is maintained even when the same user comes close to the image forming apparatus 10 for the purpose of executing another operation after the elapsed time T has reached the defined time t. Then, the processing ends.

Furthermore, when the controller 21 determines that the user's universally unique identifier UUID certified in step S108 does not correspond to the user's identifier YID stored in the storage device 18 in association with the information indicating that the print job has been executed ("No" in step S109), the controller 21 switches the image forming apparatus 10, if it is set to the sleep mode, to the standby mode or maintains the image forming apparatus 10, if it is set to the standby mode, in the standby mode (step S112). The reason for this is that the user of the mobile terminal device 30 is a user different from the user having given an instruction to execute the print job and the different user is coming to the image forming apparatus 10 for the purpose of using the image forming apparatus 10. The processing step in step S112 enables the different user to immediately use the image forming apparatus 10.

Then, the controller 21 determines, regardless of whether the different user uses the image forming apparatus 10, whether or not the elapsed time T has reached a predetermined defined time t (step S113) and determines whether or not the specific time TS has passed since the end of the job or the end of the operation of the operation device 12 as described previously and, thus, the image forming apparatus 10 has been switched from the standby mode to the sleep mode (step S114).

For example, when the controller 21 determines that the elapsed time T has not reached the defined time t ("No" in step S113) and then determines that the image forming apparatus 10 has been switched from the standby mode to the sleep mode ("Yes" in step S114), the controller 21 repeats the processing steps from step S106.

On the other hand, when, without the switch of the image forming apparatus 10 from the standby mode to the sleep mode ("No" in step S114), the elapsed time T reaches the defined time t ("Yes" in step S113), the controller 21 deletes the user's identifier YID stored, in step S104, in the storage device 18 in association with the information indicating the print job has been executed (step S111). Then, the processing ends.

The general image forming system described previously needs a motion sensor, which complicates the structure of the image forming apparatus. Furthermore, when user information relevant to a computer is not consistent with user information acquired from a name plate, this means that a user coming to the front of the image forming apparatus is different from a user coming to pick up a recording paper sheet with an image formed thereon, and, therefore, the image forming apparatus cancels the sleep mode and sets the standby mode. However, because the range of the motion sensor capable of detecting a human body is limited to the vicinity of the image forming apparatus and the time from when a human body is detected until when the different user comes to the front of the image forming apparatus is too short, the image forming apparatus is not ready to be used at the time when the different user reaches the image forming apparatus.

Unlike the above, in the first embodiment, when, after a print job is executed by the image forming apparatus 10, a user having given an instruction to execute the print job comes to the image forming apparatus 10, the image forming apparatus 10 is maintained in the sleep mode. Therefore, the image forming apparatus 10 is prevented from being switched in vain from the sleep mode to the standby mode, so that further power saving can be achieved. In addition, the sleep mode can be appropriately maintained or cancelled according to the user's convenience with a simple structure requiring no motion sensor.

Second Embodiment

Next, a description will be given of an image forming system according to a second embodiment of the present disclosure. In the image forming system Sy according to the second embodiment, the image forming apparatus 10, each mobile terminal device 30, and each PC 50 have configurations shown in FIG. 1, like the first embodiment.

In the image forming system Sy according to the second embodiment, when a print job and a user's identifier YID are sent via the network N from the PC 50 of the user to the image forming apparatus 10, the print job and the user's identifier YID are received by the network communication device 16 of the image forming apparatus 10 and stored in the storage device 18. Thereafter, when the user comes to the image forming apparatus 10 and the short-range communication device 17 of the image forming apparatus 10 receives a universally unique identifier UUID of the user sent from the short-range communication device 37 of the user's mobile terminal device 30, the controller 21 determines whether or not the user's universally unique identifier UUID corresponds to the user's identifier YID stored, together with the print job, in the storage device 18. When the controller 21 determines that the user's universally unique identifier UUID corresponds to the user's identifier YID, the controller 21 executes the received print job to allow the image forming device 15 to form an image on a recording paper sheet.

Therefore, unlike the first embodiment, in the second embodiment, even if a print job and a user's identifier YID sent via the network N from the user's PC 50 are received by the image forming apparatus 10, the image forming apparatus 10 does not immediately execute the received print job and does not execute the print job unless the user comes close to the image forming apparatus 10. Thus, the security of the image formed on the recording paper sheet based on the print job can be increased.

Figure 4:
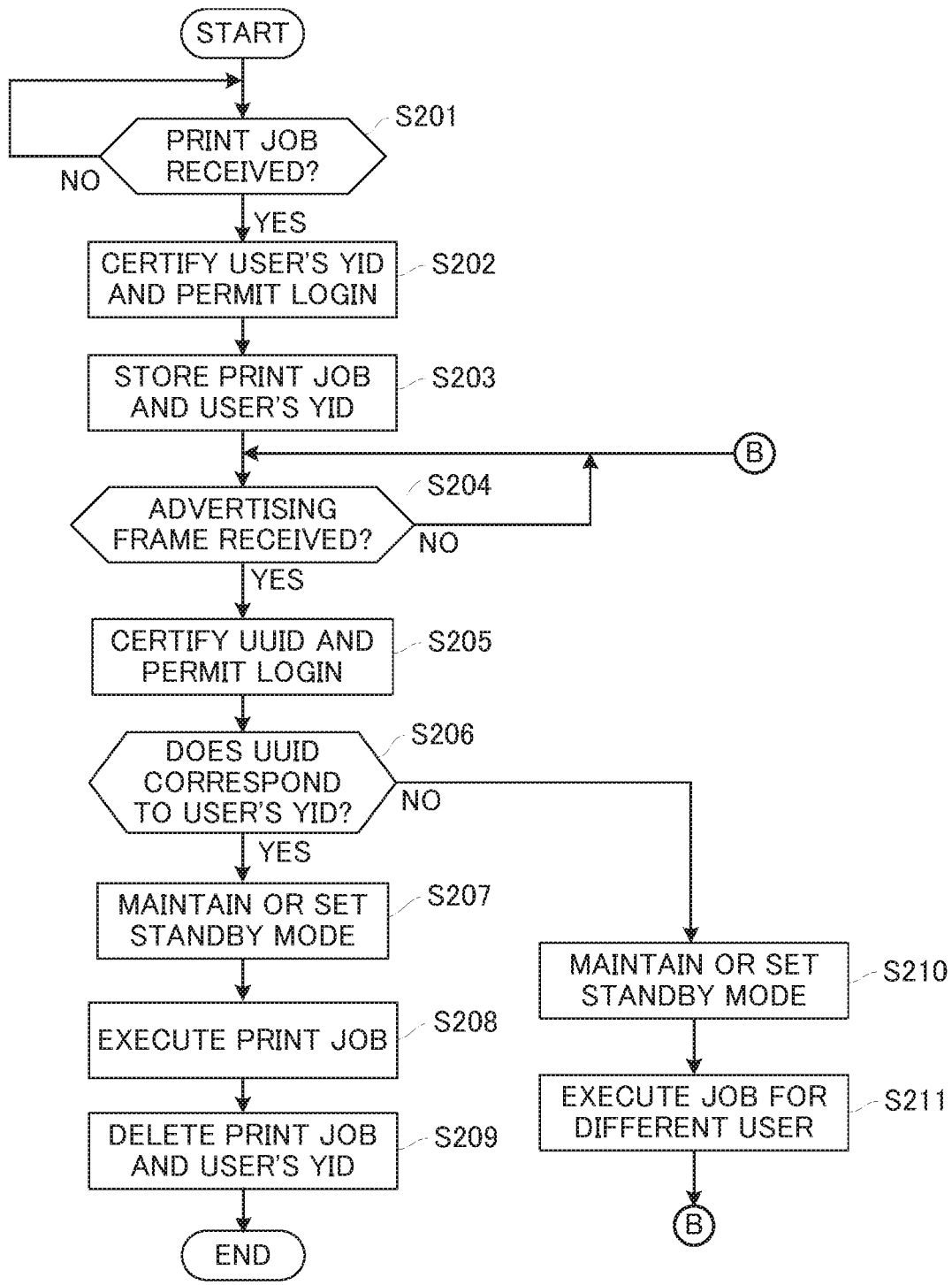
FIG. 4 is a flowchart showing a control in which a print job is sent via a network from a personal computer of a user and received by the image forming apparatus and the print job is executed on the image forming apparatus.

Next, a description will be given, in an organized way, of a control of the image forming system Sy according to the second embodiment in which, as described above, the print job and the user's identifier YID sent via the network N from the user's PC 50 are received by the image forming apparatus 10 and the received print job is executed, with reference to the flowchart shown in FIG. 4.

First, in the image forming apparatus 10, the controller 21 waits until a print job and a user's identifier YID are received by the network communication device 16 ("No" in step S201). When the print job and the user's identifier YID are sent from a PC 50 and received by the network communication device 16 ("Yes" in step S201), the controller 21 determines whether or not the user's identifier YID sent together with the print job corresponds to any one of users' identifiers YID in the login management table in the storage device 18. When the controller 21 determines that the user's identifier YID corresponds to one of the users' identifiers YID, the controller 21 certifies the received identifier YID and permits the user of the received identifier YID to log in to the image forming apparatus 10 (step S202) and allows the storage device 18 to store the received print job and user's identifier YID (step S203).

After the print job and the user's identifier YID are received and stored in the storage device 18, the controller 21 of the image forming apparatus 10 waits until an advertising frame sent from a mobile terminal device 30 is received by the short-range communication device 17 ("No" in step S204).

Then, when a user carrying a mobile terminal device 30 comes close to the image forming apparatus 10 and an advertising frame is received by the short-range communication device 17 ("Yes" in step S204), the controller 21 extracts a universally unique identifier UUID from the received advertising frame and certifies it. Furthermore, the controller 21 of the image forming apparatus 10 permits the user of the extracted universally unique identifier UUID to log in to the image forming apparatus 10 (step S205).

The controller 21 determines whether or not the certified user's universally unique identifier UUID corresponds to the user's identifier YID stored, together with the print job, in the storage device 18 in step S203 (step S206).

For example, when the controller 21 determines that the user's universally unique identifier UUID corresponds to the user's identifier YID ("Yes" in step S206), this means that the user of the mobile terminal device 30 is coming to the image forming apparatus 10 for the purpose of picking up a recording paper sheet with an image formed thereon based on the print job stored in the storage device 18. Therefore, when at this time the image forming apparatus 10 is set to the standby mode, the controller 21 maintains the image forming apparatus 10 in the standby mode. On the other hand, when at this time the image forming apparatus 10 is set to the sleep mode, the controller 21 switches the image forming apparatus 10 from the sleep mode to the standby mode (step S207). In doing so, the controller 21 runs only a function (such as the image forming device 15) necessary to execute the print job while maintaining or setting the standby mode, thus preventing a needless power increase.

When the controller 21 sets the standby mode of the image forming apparatus 10, the controller 21 executes the print job stored, together with the user's identifier YID, in the storage device 18 in step S203, thus allowing the image forming device 15 to form an image on a recording paper sheet (step S208), and deletes the print job and the user's identifier YID from the storage device 18 (step S209). Then, when the specific time TS has passed since the end of the job or the end of the operation of the operation device 12, the controller 21 switches the image forming apparatus 10 from the standby mode to the sleep mode.

On the other hand, when the controller 21 determines that the user's universally unique identifier UUID certified in step S205 does not correspond to the user's identifier YID stored, together with the print job, in the storage device 18 in step S203 ("No" in step S206), this means that the user of the mobile terminal device 30 is a user different from the user having given an instruction to execute the print job and the different user is coming to the image forming apparatus 10 for the purpose of using it. Therefore, when at this time the image forming apparatus 10 is set to the standby mode, the controller 21 maintains the image forming apparatus 10 in the standby mode. When at this time the image forming apparatus 10 is set to the sleep mode, the controller 21 switches the image forming apparatus 10 from the sleep mode to the standby mode (step S210).

Then, the controller 21 executes a job instructed by the different user (step S211). For example, when the user of the mobile terminal device 30 places an original document in the image reading device 14 and operates the operation device 22 or the touch panel 23 to select a copy job and give an instruction to execute the copy job, the controller 21 accepts the instruction, allows the image reading device 14 to read an image of the original document, and allows the image forming device 15 to form the image of the original document on a recording paper sheet. Thereafter, the controller 21 repeats the processing steps from step S204.

As thus far described, in the second embodiment, a print job and a user's identifier YID are sent from a PC 50 of a user via the network N to the image forming apparatus 10 and stored in the storage device 18 of the image forming apparatus 10. Thereafter, when the user comes to the image forming apparatus 10, the print job is executed. Thus, the security of the image formed on the recording paper sheet based on the print job can be increased.

Although in the first and second embodiments an IC card is cited as an example of the mobile terminal device 30, the mobile terminal device 30 may be a smartphone or other types of mobile devices.

In applying a smartphone, a mobile PC or the like as the mobile terminal device 30, the user of the mobile terminal device 30 may operate, instead of the PC 50, the mobile terminal device 30 itself to send a print job and a user's own identifier YID from the mobile terminal device 30 via the network N to the image forming apparatus 10 or send them from the mobile terminal device 30 via short-range communication to the image forming apparatus 10.

Furthermore, in the first and second embodiments, when an advertising frame sent from the short-range communication device 37 of the mobile terminal device 30 is received by the short-range communication device 17 of the image forming apparatus 10, the user of the mobile terminal device 30 is considered to be coming close to the image forming apparatus 10 and, thus, subsequent control is performed. Instead of this, the controller 21 of the image forming apparatus 10 may receive, at the short-range communication device 17 of the image forming apparatus 10, a signal sent from the short-range communication device 37 of the mobile terminal device 30, measure the distance between the image forming apparatus 10 and the mobile terminal device 30 based on the reception level of the received signal, and, at the time when the measured distance becomes shorter than a predetermined specific distance, consider the user of the mobile terminal device 30 to be coming close to the image forming apparatus 10, and thus perform subsequent control.

Moreover, in another modification of the second embodiment, for example, a first distance may be defined to be 1 m within which the user of the mobile terminal device 30 can operate the image forming apparatus 10, and a second distance may be defined to be 5 m longer than the first distance. The controller 21 of the image forming apparatus 10 measures the distance between the image forming apparatus 10 and the mobile terminal device 30 based on the reception level of a signal received by the short-range communication device 17. When the measured distance becomes shorter than the first distance, the controller 21 determines that the user of the mobile terminal device 30 is coming to the image forming apparatus 10 for the purpose of picking up a recording paper sheet, sets the image forming apparatus 10 to the standby mode, executes the print job, and deletes the print job and the user's identifier YID from the storage device 18. Then, when the subsequently measured distance becomes longer than the second distance, the controller 21 switches the image forming apparatus 10 from the standby mode to the sleep mode. Thus, only when the user of the mobile terminal device 30 comes sufficiently close to the image forming apparatus 10, the print job is executed, the print job and the user's YID are then deleted, and the switch from the standby mode to the sleep mode is appropriately made.

Furthermore, in the first and second embodiments, the image forming apparatus 10 is set to a central (master) device for advertising communication, the mobile terminal device 30 is set to a peripheral (slave) device for advertising communication, and an advertising frame is sent from the mobile terminal device 30 to the image forming apparatus 10. However, conversely, the image forming apparatus 10 may be set to a peripheral device, the mobile terminal device 30 may be set to a central device, and an advertising frame may be sent from the image forming apparatus 10 to the mobile terminal device 30. In this case, the controller 41 of the mobile terminal device 30 extracts a universally unique identifier UUID from a sent advertising frame, certifies the extracted universally unique identifier UUID, and establishes short-range communication through a data channel with the image forming apparatus 10.

Although the description in the first and second embodiments has been given using a multifunction peripheral as an example of the image forming apparatus according to the present disclosure, the multifunction peripheral is merely illustrative and the image forming apparatus may be a copier, a printer or other types of image forming apparatuses.

The structures, configurations, and processing described in the first and second embodiments with reference to FIGS. 1 to 4 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image forming system including an image forming apparatus and a mobile terminal device that performs short-range communication with the image forming apparatus,
the image forming apparatus comprising:
an image forming device that forms an image on a recording paper sheet;
a storage device that stores first identification information for use in identifying a user having given an instruction to form the image;
a first short-range communication device that performs wireless communication with the mobile terminal device; and
a first control device that include a processor and, upon execution of a control program by the processor, functions as a first controller that, when the first short-range communication device receives second identification information sent from the mobile terminal device and for use in identifying a user of the mobile terminal device after the first controller allows the image forming device to form the image on the recording paper sheet and allows the storage device to store the first identification information, determines whether or not the received second identification information corresponds to the first identification information stored in the storage device, wherein when the first controller determines that the second identification information corresponds to the first identification information while the image forming apparatus is set to a sleep mode requiring less power, the first controller maintains the image forming apparatus in the sleep mode, and wherein when the first controller determines that the second identification information does not correspond to the first identification information while the image forming apparatus is set to the sleep mode, the first controller cancels the sleep mode,
the mobile terminal device comprising:
a second short-range communication device that performs wireless communication with the image forming apparatus; and
a second control device that includes a processor and, upon execution of a control program by the processor, functions as a second controller that, when the first short-range communication device of the image forming apparatus or the second short-range communication device of the mobile terminal device performs advertising communication to enable short-range communication between the first short-range communication device and the second short-range communication device, allows the second short-range communication device to send the second identification information to the first short-range communication device.

2. The image forming system according to claim 1, wherein when the first controller determines that the received second identification information corresponds to the first identification information stored in the storage device, the first controller deletes the first identification information from the storage device.

3. The image forming system according to claim 1, wherein the first short-range communication device and the second short-range communication device perform wireless communication based on a Bluetooth® Low Energy standard.

4. The image forming system according to claim 1,
further comprising a terminal device that sends the image to be formed and the first identification information via a network to the image forming apparatus,
wherein the image forming apparatus further comprises a network communication device that receives the image and the first identification information both sent from the terminal device, and
when the network communication device receives the image and the first identification information, the first controller allows the image forming device to form the received image on a recording paper sheet and allows the storage device to store the received first identification information.

5. The image forming system according to claim 1, wherein
the mobile terminal device further comprises a second network communication device that sends the image to be formed and the first identification information via a network to the image forming apparatus,
the image forming apparatus further comprises a first network communication device that receives the image and the first identification information both sent from the mobile terminal device, and
when the first network communication device receives the image and the first identification information, the first controller allows the image forming device to form the received image on a recording paper sheet and allows the storage device to store the received first identification information.

6. The image forming system according to claim 1, wherein
the second controller of the mobile terminal device allows the second short-range communication device to send the first identification information, together with a print job containing the image to be formed, to the image forming apparatus, and when the first short-range communication device receives the first identification information together with the print job, the first controller of the image forming apparatus allows the storage device to store the received first identification information in association with the print job.

7. An image forming apparatus that performs short-range communication with a mobile terminal device, the image forming apparatus comprising:
 an image forming device that forms an image on a recording paper sheet;
 a storage device that stores first identification information for use in identifying a user having given an instruction to form the image;
 a first short-range communication device that performs wireless communication with the mobile terminal device; and
 a first control device that includes a processor and, upon execution of a control program by the processor, functions as a first controller that, when the first short-range communication device receives second identification information sent from the mobile terminal device and for use in identifying a user of the mobile terminal device after the first controller allows the image forming device to form the image on the recording paper sheet and allows the storage device to store the first identification information, determines whether or not the received second identification information corresponds to the first identification information stored in the storage device, wherein when the first controller determines that the second identification information corresponds to the first identification information while the image forming apparatus is set to a sleep mode requiring less power, the first controller maintains the image forming apparatus in the sleep mode, and wherein when the first controller determines that the second identification information does not correspond to the first identification information while the image forming apparatus is set to the sleep mode, the first controller cancels the sleep mode.

8. An image forming system including an image forming apparatus and a mobile terminal device that performs short-range communication with the image forming apparatus,
 the image forming apparatus comprising:
 an image forming device that forms an image on a recording paper sheet;
 a storage device that stores the image to be formed and first identification information for use in identifying a user having given an instruction to form the image;
 a first short-range communication device that performs wireless communication with the mobile terminal device; and
 a first control device that include a processor and, upon execution of a control program by the processor, functions as a first controller that, when the first short-range communication device receives second identification information sent from the mobile terminal device and for use in identifying a user of the mobile terminal device after the first controller allows the storage device to store the image and the first identification information, determines whether or not the received second identification information corresponds to the first identification information stored in the storage device, wherein when the first controller determines that the second identification information corresponds to the first identification information, the first controller allows the image to be read from the storage device and allows the image forming apparatus to form the read image on a recording paper sheet,
 the mobile terminal device comprising:
 a second short-range communication device that performs wireless communication with the image forming apparatus; and
 a second control device that includes a processor and, upon execution of a control program by the processor, functions as a second controller that, when the first short-range communication device of the image forming apparatus or the second short-range communication device of the mobile terminal device performs advertising communication to enable short-range communication between the first short-range communication device and the second short-range communication device, allows the second short-range communication device to send the second identification information to the first short-range communication device.

9. The image forming system according to claim 8,
 further comprising a terminal device that sends the image to be formed and the first identification information via a network to the image forming apparatus,
 wherein the image forming apparatus further comprises a network communication device that receives the image and the first identification information both sent from the terminal device, and
 when the network communication device receives the image and the first identification information, the first controller keeps the image forming device from forming the received image on a recording paper sheet and allows the storage device to store the received image and the received first identification information.

10. The image forming system according to claim 8, wherein when the image forming apparatus is set to a sleep mode requiring less power regardless of whether or not the received second identification information corresponds to the first identification information, the first controller cancels the sleep mode.

* * * * *